(12) United States Patent
Skaljin et al.

(10) Patent No.: US 11,741,305 B2
(45) Date of Patent: Aug. 29, 2023

(54) SYSTEMS AND METHODS FOR AUTOMATICALLY ASSESSING FAULT IN RELATION TO MOTOR VEHICLE COLLISIONS

(71) Applicant: The Toronto-Dominion Bank, Toronto (CA)

(72) Inventors: Robert Skaljin, Hamilton (CA); Jillian Margaret Pigot Rivard, Etobicoke (CA); Justin Wiswell, Toronto (CA); Cameron Flynn, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 987 days.

(21) Appl. No.: 16/594,893

(22) Filed: Oct. 7, 2019

(65) Prior Publication Data

US 2021/0103772 A1 Apr. 8, 2021

(51) Int. Cl.
*G06F 40/30* (2020.01)
*G07C 5/08* (2006.01)
(Continued)

(52) U.S. Cl.
CPC ............. *G06F 40/30* (2020.01); *B62D 41/00* (2013.01); *G06F 18/214* (2023.01);
(Continued)

(58) Field of Classification Search
CPC .... G06K 9/6256; G06K 9/626; G06K 9/6272; B62D 41/00; G06F 40/30; G06F 18/214;
(Continued)

(56) References Cited

U.S. PATENT DOCUMENTS 7,739,133 B1 * 6/2010 Hail ....................... G06Q 40/08
705/2
7,742,936 B2 6/2010 Wahlbin et al.
(Continued)

FOREIGN PATENT DOCUMENTS

KR 20190074356 A 6/2019
KR 20190065840 A 12/2019
(Continued)

OTHER PUBLICATIONS

Thakur et al.: "Prediction of Online Vehicle Insurance System using Decision Tree Classifier and Bayes Classifier—A Comparative Analysis", International Conference on Microelectronics, Circuits and Systems (MICRO-2014), found via Google, https://pdfs.semanticscholar.org/bcad/b01a80593ebb604bb72c9ddad6dee94b564b.pdf.
(Continued)

*Primary Examiner* — Angelina Shudy
(74) *Attorney, Agent, or Firm* — Rowand LLP

(57) ABSTRACT

A computer-implemented method of providing a recommendation as to a fault determination for a motor vehicle collision is disclosed. The method may include receiving unstructured text describing the circumstances of the collision. The unstructured text is evaluated an associated intent related to the circumstances of the motor vehicle collision is identified. The intent is mapped to an internal node of a decision tree corresponding to a set of fault-determination rules. The computer then successively prompts and receive input responsive to the prompting that corresponds to details of the circumstances of the collision. The computer may identify, based on the received input, a path through the decision tree ending at a leaf node that corresponds to a fault-determination rule governing motor vehicle collisions that matches the circumstances of the motor vehicle collision. The recommendation is then provided based on that
(Continued)

rule. Related systems and computer-readable media are also disclosed.

19 Claims, 6 Drawing Sheets

(51) Int. Cl.
| | |
|---|---|
| *G06N 3/08* | (2023.01) |
| *G07C 5/00* | (2006.01) |
| *B62D 41/00* | (2006.01) |
| *G06F 18/214* | (2023.01) |
| *G06F 18/24* | (2023.01) |
| *B60W 50/02* | (2012.01) |

(52) U.S. Cl.
CPC ......... *G06F 18/24765* (2023.01); *G06N 3/08* (2013.01); *G07C 5/008* (2013.01); *G07C 5/0841* (2013.01); *B60W 50/0205* (2013.01)

(58) Field of Classification Search
CPC ........ G06F 18/24765; G06F 18/24137; G06V 10/774; G06V 30/19147; G06V 10/765; G06V 30/19153; G06N 3/08; G06N 5/003; G06N 5/01; G07C 5/008; G07C 5/0841; B60W 50/0205
See application file for complete search history.

(56) References Cited

U.S. PATENT DOCUMENTS

| | | | | |
|---|---|---|---|---|
| 9,019,092 | B1* | 4/2015 | Brandmaier | B60R 21/0136 |
| | | | | 340/436 |
| 9,172,747 | B2 | 10/2015 | Walters | |
| 9,792,656 | B1 | 10/2017 | Konrardy et al. | |
| 9,794,199 | B2 | 10/2017 | Capper et al. | |
| 9,994,218 | B2 | 6/2018 | Pal et al. | |
| 10,121,204 | B1* | 11/2018 | Brandmaier | G07C 5/008 |
| 10,223,544 | B1* | 3/2019 | Pogde | H04L 9/0891 |
| 10,176,804 | B2 | 8/2019 | Jiang et al. | |
| 10,417,713 | B1* | 9/2019 | Brandmaier | G06Q 40/08 |
| 10,599,155 | B1* | 3/2020 | Konrardy | G06N 3/0454 |
| 10,657,603 | B1* | 5/2020 | Harding | G06F 16/116 |
| 10,891,694 | B1* | 1/2021 | Leise | G08G 1/0112 |
| 10,949,926 | B1* | 3/2021 | Call | G06Q 40/08 |
| 11,386,498 | B1* | 7/2022 | Leise | G06N 20/00 |
| 11,449,946 | B1* | 9/2022 | Gutsell | G06F 40/205 |
| 11,599,516 | B1* | 3/2023 | Sorenson | G06F 16/2282 |
| 2004/0103010 | A1* | 5/2004 | Wahlbin | G06Q 40/08 |
| | | | | 705/1.1 |
| 2004/0111301 | A1* | 6/2004 | Wahlbin | G06Q 40/08 |
| | | | | 705/4 |
| 2007/0282824 | A1* | 12/2007 | Ellingsworth | G06F 16/313 |
| | | | | 707/999.005 |
| 2013/0304517 | A1* | 11/2013 | Florence | G06Q 40/08 |
| | | | | 705/4 |
| 2014/0114692 | A1* | 4/2014 | Pearce | G06Q 40/08 |
| | | | | 705/4 |
| 2016/0292696 | A1* | 10/2016 | Gong | G06Q 30/018 |
| 2017/0053461 | A1* | 2/2017 | Pal | G06V 20/597 |
| 2017/0061544 | A1* | 3/2017 | McClain | G06Q 40/08 |
| 2018/0075309 | A1* | 3/2018 | Sathyanarayana | G05D 1/0055 |
| 2018/0300815 | A1* | 10/2018 | Collins | G06Q 30/0278 |
| 2018/0365228 | A1 | 12/2018 | Galitsky | |
| 2019/0166071 | A1 | 5/2019 | Lim et al. | |
| 2019/0236134 | A1 | 8/2019 | Galitsky | |
| 2019/0138595 | A1 | 9/2019 | Galitsky | |
| 2021/0004909 | A1* | 1/2021 | Farmer | G06Q 40/08 |
| 2021/0110484 | A1* | 4/2021 | Shalev-Shwartz | B60W 10/18 |
| 2021/0224975 | A1* | 7/2021 | Ranca | G06F 18/231 |
| 2021/0304317 | A1* | 9/2021 | Leise | G06F 16/29 |
| 2021/0326992 | A1* | 10/2021 | Leise | H04L 9/3249 |
| 2021/0342946 | A1* | 11/2021 | Leise | G06Q 20/4015 |
| 2022/0005291 | A1* | 1/2022 | Konrardy | G07C 5/008 |
| 2022/0227367 | A1* | 7/2022 | Kario | B60W 30/0956 |
| 2023/0012186 | A1* | 1/2023 | Siegel | G07C 5/0833 |

FOREIGN PATENT DOCUMENTS

| | | |
|---|---|---|
| WO | 2018081020 A1 | 5/2018 |
| WO | 2019083392 A1 | 2/2019 |

OTHER PUBLICATIONS

Gotzer: "Engineering and user experience of chatbots in the context of damage recording for insurance companies", http://dx.doi.org/10.18419/opus-10263, issue date 2018.

Adkoli: "Chatbots: Conducting Intelligent Conversations with Customers", retrieved from https://opensourceforu.com/2019/02/chatbots-conducting-intelligent-conversations-with-, dated Feb. 14, 2019.

North: "Chatbots take the hassle out of financial services", Daily News, dated Apr. 11, 2019.

"Fault Determination Rules", R.R.O. 1990, Regulation 668 under the Insurance Act,, R.S.O. 1990, c. I.8, Queen's Printer for Ontario, retrieved on Oct. 7, 2019, last amended by Ontario Regulation 445/18 which was made on Oct. 17, 2018.

* cited by examiner

SYSTEMS AND METHODS FOR AUTOMATICALLY ASSESSING FAULT IN RELATION TO MOTOR VEHICLE COLLISIONS

FIELD

This relates to artificial intelligence and, more particularly, to automatic decision support systems for use in assessing fault in motor vehicle collisions.

BACKGROUND

In motor vehicle collisions, one or both of the parties may be considered "at fault" to a complete or partial degree. For example, in the simple case of a rear-end collision where a first vehicle rear-ends a second vehicle while the second vehicle is stopped at a traffic light, most insurers and jurisdictions will consider the first vehicle to be completely at fault. Historically, having a computer determine fault across the variety of possible circumstances of different motor vehicle collisions has not been considered practical or possible.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
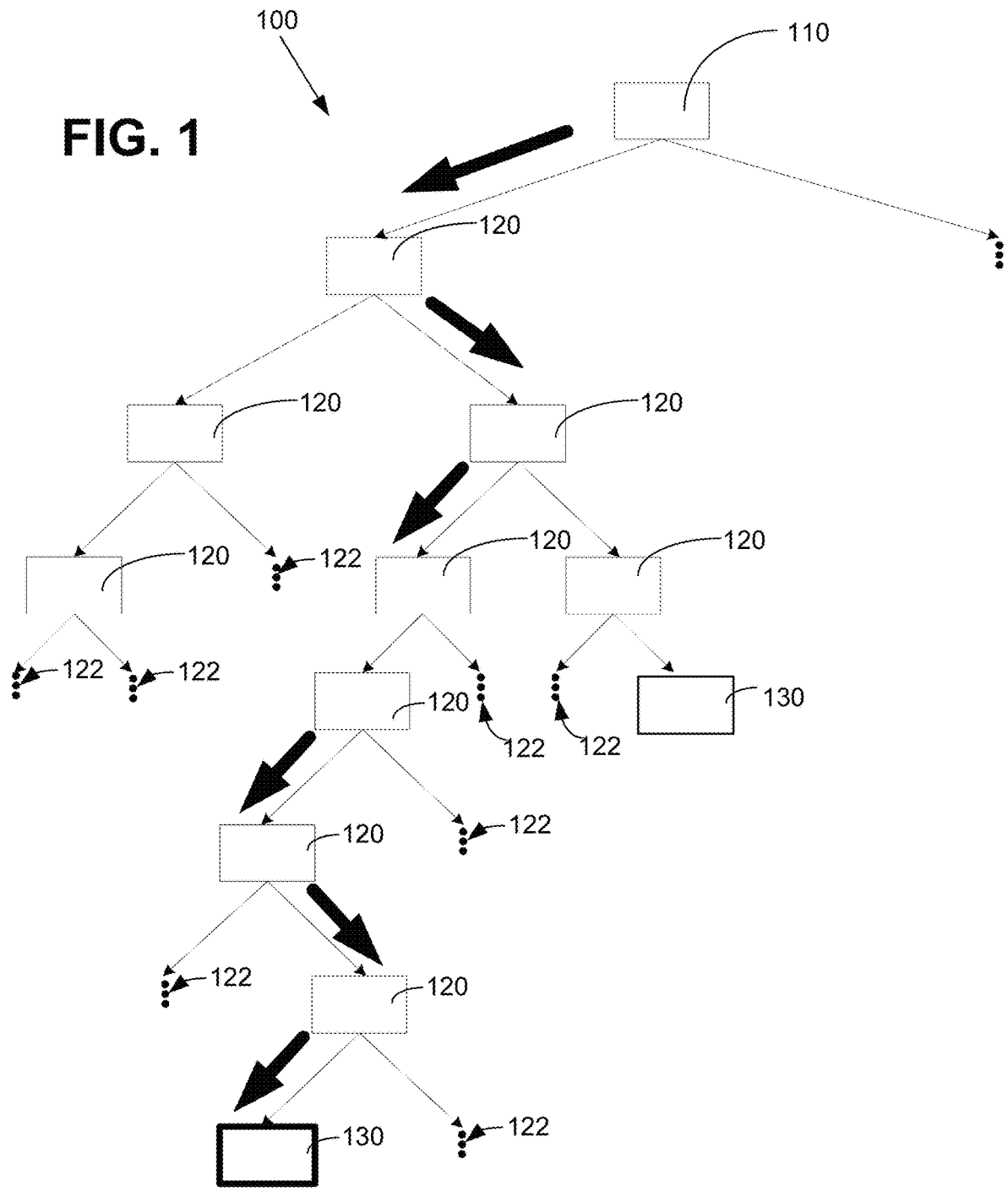
FIG. 1 shows an example decision tree based on a set of fault-determination rules.

Fault in motor vehicle collisions may be determined in a variety of manners. In many jurisdictions, legislation defines the manner in which motor vehicle collision fault must be determined. For example, in many jurisdictions utilizing some variant of "no fault" insurance, fault may be determined in accordance with a set of rules.

In a particular example, in certain Canadian provinces (Ontario, PEI, NB, QC), whether a motor vehicle accident is considered "at fault" or not "at fault" is determined according to a set of fault-determination rules set out in government regulations. For example, Ontario's fault-determination rules are set out in Reg. 668 under the Insurance Act ("Fault Determination Rules", Revised Regulations Ontario (RRO) 1990, Reg. 668). The contents of the most recent consolidated version of Reg. 668 as last amended by Ontario Regulation 445/18 are available from the Queen's Printer for Ontario and online at https://www.ontario.ca/laws/regulation/900668 (retrieved Oct. 7, 2019). The contents of the most recent consolidated version of Reg. 668 as of Oct. 7, 2019 are herein incorporated by reference in their entirety.

A review of a set of fault-determination rules (such, for example, those set out in Reg. 668) may reveal that they are relatively complicated, involving a large number of possible scenarios, including illustrations of various accident scenarios and variations thereof. For example, this complexity is apparent in the text of the Ontario rule related to accidents in parking lots which is set out below in Table 1. As exemplified by that rule, application of fault-determination rules requires careful consideration of both the nature and circumstances of a given collision, including the configuration of the location where the accident occurs. Furthermore, resort to other rules may be required such as, for example, in the case of the parking lot rule if the collision occurs "on a thoroughfare".

TABLE 1

Province of Ontario, Canada fault-determination rule for parking lot collisions
RULES FOR AUTOMOBILES IN PARKING LOTS 16. (1) This section applies with respect to incidents in parking lots.
    (2) The degree of fault of a driver involved in an incident on a thoroughfare shall be determined in accordance with this Regulation as if the thoroughfare were a road.
    (3) If automobile "A" is leaving a feeder lane and fails to yield the right of way to automobile "B" on a thoroughfare, the driver of automobile "A" is 100 percent at fault and the driver of automobile "B" is not at fault for the incident.
    (4) If automobile "A" is leaving a parking space and fails to yield the right of way to automobile "B" on a feeder lane or a thoroughfare, the driver of automobile "A" is 100 percent at fault and the driver of automobile "B" is not at fault for the incident.
    (5) In this section,
        "feeder lane" means a road in a parking lot other than a thoroughfare;
        "thoroughfare" means a main road for passage into, through or out of a parking lot.

Because of the complexity of fault-determination rules, the application of such rules to accidents may require significant training. This may make it impractical to train all persons involved in handling insurance claims in how to apply the fault-determination rules. Accordingly, some persons such as, for example, insurer telephone call center agents, may not be trained in how to assess fault using a given set of fault-determination rules. Additionally or alternatively, some such persons—for example, direct insurance representatives—may only be trained on how fault should be determined in the most common situations. This, however may mean, that fault determination and, thus clients waiting for their claims to be handled, must wait, for example, while specially trained workers are consulted in the case of a claim related to an accident not corresponding to one of those most common situations.

By way of overview, according to the subject matter of the present application, natural language processing is employed to allow fault to be determined according to fault-determination rules without requiring a human expert to be consulted. More particularly, natural language processing is employed together with a decision tree corresponding to a set of fault-determination rules in order to provide a recommendation as to fault based, at least in part, on natural language input (unstructured text) describing the circumstances of a motor vehicle collision.

According to the subject matter of the present application, there may be provided a computer system. The computer system may include a processor and a memory. The memory may store instructions that, when executed by the computer system, cause the computer system to: receive, by the processor, unstructured text describing the circumstances of a motor vehicle collision; evaluate, by the processor, the unstructured text and identify, based on the evaluation, an associated intent related to the circumstances of the motor vehicle collision; map the intent to an internal node of a decision tree corresponding to a set of prescribed fault-determination rules; successively prompt and receive, by the processor, input responsive to the prompting and corresponding to details of the circumstances of the motor vehicle collision and identify, based on the received input, a path through the decision tree starting from the internal node and ending at a leaf node of the decision tree, the leaf node corresponding to a fault-determination rule governing motor vehicle collisions and matching the circumstances of the motor vehicle collision; and provide, by the processor, a recommendation as to a fault determination for the motor vehicle collision based on the fault-determination rule.

Conveniently in this way, a recommendation as to fault determination for a motor vehicle accident may be provided in accordance with a prescribed set of fault-determination rules while avoiding the need to review each of the fault-determination rules individually. Additionally, the need to navigate the entirety depth of a decision tree based on the rules may also be avoided. In this way, a recommendation as to fault determination may be efficiently provided despite a motor vehicle collision having more complex and/or more unusual circumstances than would be captured by a simple subset of the fault-determination rules covering the most common and/or simple circumstances. For example, a chat bot may be provided utilizing such a system to provide a recommendation as to fault determination. Conveniently, such a solution may allow a fault determination to be made by a person who has received no training on the details of the fault-determination rules and/or has received much less training than otherwise might be required to make a fault determination according to the rules.

In some implementations, the instructions, when executed by the computer system, may further cause the computer system to: initiate processing of an insurance claim related to the motor vehicle collision. It may be that responsibility for the motor vehicle collision is to be apportioned between one or more insurers based on the recommendation as to the determination of fault.

In some implementations, the prompting may include presenting prompts based on intermediate nodes along the path between the internal node and the leaf node of the decision tree.

In some implementations, the prescribed fault-determination rules may correspond to a first regulatory jurisdiction.

Additionally, providing the recommendation as to the determination of fault for the motor vehicle collision based on the fault-determination rule may include mapping the fault-determination rule to a corresponding fault-determination rule of a second regulatory jurisdiction and providing the recommendation as to the determination of fault based on the corresponding fault-determination rule.

In some implementations, the instructions, when executed by the computer system, may further cause the computer system to: identify the second regulatory jurisdiction from amongst a plurality of secondary regulatory jurisdictions.

For example, it may be that the second regulatory jurisdiction is identified based on a current location of an input device used to provide the unstructured text describing the circumstances of the motor vehicle collision and/or the input received responsive to the prompting.

In some implementations, at least one of the secondary regulatory jurisdictions may have an associated set of fault-determination rules that is less specific than the prescribed fault-determination rules of the first regulatory jurisdiction.

In some implementations, the instructions, when executed by the computer system, may further cause the computer system to: calculate a confidence level in association with the recommendation.

In some implementations, the instructions, when executed by the computer system, may further cause the computer system to: add the recommendation as to the determination of fault and the associated confidence level to a data set for training a natural-language processing neural network for use in evaluating unstructured text describing the circumstances of motor vehicle collisions to identify intents related to the circumstances of the motor vehicle collisions.

In some implementations, the evaluation of the unstructured text and the identification of the associated intent related to the circumstances of the motor vehicle collision may be performed using a natural-language processing neural network trained using an earlier version of the data set.

In some implementations, the unstructured text describing the circumstances of the motor vehicle collision and/or the input received responsive to the prompting may be received via a chat bot.

In some implementations, the instructions, when executed by the computer system, may further cause the computer system to: identify the decision tree from amongst a plurality of decision trees corresponding to sets of prescribed fault-determination rules of different jurisdictions.

According to the subject-matter of the present application, there may be provided a computer-implemented method. The method may include receiving unstructured text describing the circumstances of a motor vehicle collision; evaluating the unstructured text and identifying, based on the evaluation, an associated intent related to the circumstances of the motor vehicle collision; mapping the intent to an internal node of a decision tree corresponding to a set of prescribed fault-determination rules; successively prompting and receiving input responsive to the prompting and corresponding to details of the circumstances of the motor vehicle collision and identifying, based on the received input, a path through the decision tree starting from the internal node and ending at a leaf node of the decision tree, the leaf node corresponding to a fault-determination rule governing motor vehicle collisions and matching the circumstances of the motor vehicle collision; and providing a recommendation as to a fault determination for the motor vehicle collision based on the fault-determination rule.

In some implementations, the method may further include: initiating processing of an insurance claim related to the motor vehicle collision. It may be that responsibility for the motor vehicle collision is to be apportioned between one or more insurers based on the recommendation as to the determination of fault.

In some implementations, the prompting may include presenting prompts based on intermediate nodes along the path between the internal node and the leaf node of the decision tree.

In some implementations, the prescribed fault-determination rules may correspond to a first regulatory jurisdiction. Additionally, providing the recommendation as to the determination of fault for the motor vehicle collision based on the fault-determination rule may include mapping the fault-determination rule to a corresponding fault-determination rule of a second regulatory jurisdiction and providing the recommendation as to the determination of fault based on the corresponding fault-determination rule.

In some implementations, the method may include further include: identifying the second regulatory jurisdiction from amongst a plurality of secondary regulatory jurisdictions. It may be that the second regulatory jurisdiction is identified based on a current location of an input device used to provide at least one of the unstructured text describing the circumstances of the motor vehicle collision and the input received responsive to the prompting.

In some implementations, at least one of the secondary regulatory jurisdictions may have an associated set of fault-determination rules that is less specific than the prescribed fault-determination rules of the first regulatory jurisdiction.

In some implementations, the method may further include: calculating a confidence level in association with the recommendation as to the determination of fault; and adding the recommendation as to the determination of fault and the associated confidence level to a data set for training a natural-language processing neural network for use in evaluating unstructured text describing the circumstances of motor vehicle collisions to identify intents related to the circumstances of the motor vehicle collisions. The evaluation of the unstructured text and the identification of the associated intent related to the circumstances of the motor vehicle collision may be performed using a natural-language processing neural network trained using an earlier version of the data set.

According to the subject matter of the present application, there may be provided a computer-readable medium. The computer-readable medium may be a non-transitory computer-readable storage medium. The computer-readable medium may store instructions that, when executed by a processor of a computer system, cause the computer system to perform the above-described method.

According to the subject matter of the present application, there may be provided a computer-readable medium. The computer-readable medium may be a non-transitory computer-readable storage medium. The computer-readable medium may store instructions that, when executed by a processor of a computer system, cause the computer system to: receive unstructured text describing the circumstances of a motor vehicle collision; evaluate the unstructured text and identify, based on the evaluation, an associated intent related to the circumstances of the motor vehicle collision; map the intent to an internal node of a decision tree corresponding to a set of prescribed fault-determination rules; successively prompt and receive input responsive to the prompting and corresponding to details of the circumstances of the motor vehicle collision and identify, based on the received input, a path through the decision tree starting from the internal node and ending at a leaf node of the decision tree, the leaf node corresponding to a fault-determination rule governing motor vehicle collisions and matching the circumstances of the motor vehicle collision; and provide a recommendation as to a fault determination for the motor vehicle collision based on the fault-determination rule.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

As mentioned above, the inventors have recognized that a given set of fault-determination rules may, with some effort, be reduced to a decision tree. For example, such a decision tree could be produced using techniques as may be known, for example, to persons skilled in the art of operations research.

A decision tree corresponding to a set of fault-determination rules tree may, for example, be a binary tree in which internal nodes of the tree correspond to binary-response (e.g., yes/no) questions, edges between nodes correspond to responses (e.g., "yes" and "no"), and leaf nodes correspond to fault-determinations. Notably, many sets of fault-determination rules such as, for example, the Ontario rules discussed above, are complex and take into account a large number of details related to the particulars and circumstances of collisions such that such a decision tree may be particularly extensive (i.e., have a large number of nodes and edges).

An example decision tree 100 based on a set of fault-determination rules is shown in FIG. 1.

As illustrated, the example decision tree 100 includes a root node 110, internal nodes 120, and leaf nodes 130. In depicting the example decision tree 100, not all of its various nodes have been shown for the sake of compactness. Ellipses 122 depict portions of the tree that have been omitted in FIG. 1. The ellipses 122 thus correspond to various internal nodes and leaf nodes that are not shown in FIG. 1. More broadly, the depiction of the example decision tree 100 has been deliberately simplified. For example, the height of an actual decision tree for a set of fault-determination rules would typically be much higher (i.e., the tree would be deeper than the example decision tree 100 is depicted as being).

As mentioned above, the internal nodes 120 may each correspond to a respective binary-response (e.g., yes/no) question related to the facts of a given motor vehicle collision. The edges extending from the internal nodes 120 may correspond to responses (e.g., "yes" or "no"). For example, the left-hand edges from of each of the internal nodes 120 may correspond to negative ("no") responses while the right-hand edges extending from each of the leaf-nodes may correspond to affirmative ("yes") responses. Notably, the root node 110 also corresponds to a binary-response question and may, because the example decision tree 100 has more than one node, be considered one of the internal nodes 120.

The leaf nodes 130 correspond to fault determinations. For example, a given one of the leaf nodes 130 may correspond to a first driver involved in a collision having some share of fault (e.g., 0%, 50%, 100%, etc.) and a second driver involved in the collision having some commensurate share of fault (e.g., 100%, 50%, 0%, etc.). Notably, at least some of the leaf nodes 130 may correspond to fault determinations involving more than two vehicles/drivers and/or involving a single vehicle/driver.

In theory, fault may be assessed for a given motor vehicle collision using a set of facts related to a given motor vehicle collision to, starting from the root node 110, navigate the example decision tree 100 by assessing the questions associated with each of the internal nodes 120 using the facts to determine the edge/arc to follow from a given one of the internal nodes 120 to a next node and so on and so forth, defining a path through the example decision tree 100 ending where one of the leaf nodes 130 is reached. Then, a fault determination may be provided based on that one of the leaf nodes 130. A simplified illustration of navigating the example decision tree 100 for some set of facts is depicted using a set of bold arrows illustrating a path through the tree ending at the one of the leaf nodes 130 that is outlined in bold in FIG. 1.

As discussed above, the example decision tree 100 has been simplified including by showing it as having an artificially low height (depth). In actuality, use of the example decision tree 100 to manually assess fault would be impractical. For example, it would be time-prohibitive for a human to use such a tree manually. Indeed, even if a computer was used to prompt a user as to each of the questions corresponding to the ones of the internal nodes 120 encountered while navigating the tree, such a navigation could not reasonably be completed in, for example, the amount of time allotted to a direct insurance representative tor consider fault in relation to a given motor vehicle collision. For example, it may be desirable to have an insurance representative determine fault, at least provisionally, during a telephone call with a customer. (Notably, for example, this could allow for "one call" resolution of at least some motor vehicle insurance claims.) In any event, a person assessing fault would not reasonably be expected to manually employ a decision tree to assess fault as they would likely be able to more easily and/or efficiently reach a fault determination by referencing the corresponding fault-determination rules directly.

The subject matter of the present application employs natural language processing techniques to speed navigation of a fault determination tree (a decision tree based on a set of fault-determination rules). In particular, an automated system according to the subject matter of the present application may allow for determination of fault based, at least in part, on a free-form, unstructured, natural language description of the circumstances of a given motor vehicle collision.

Figure 2:
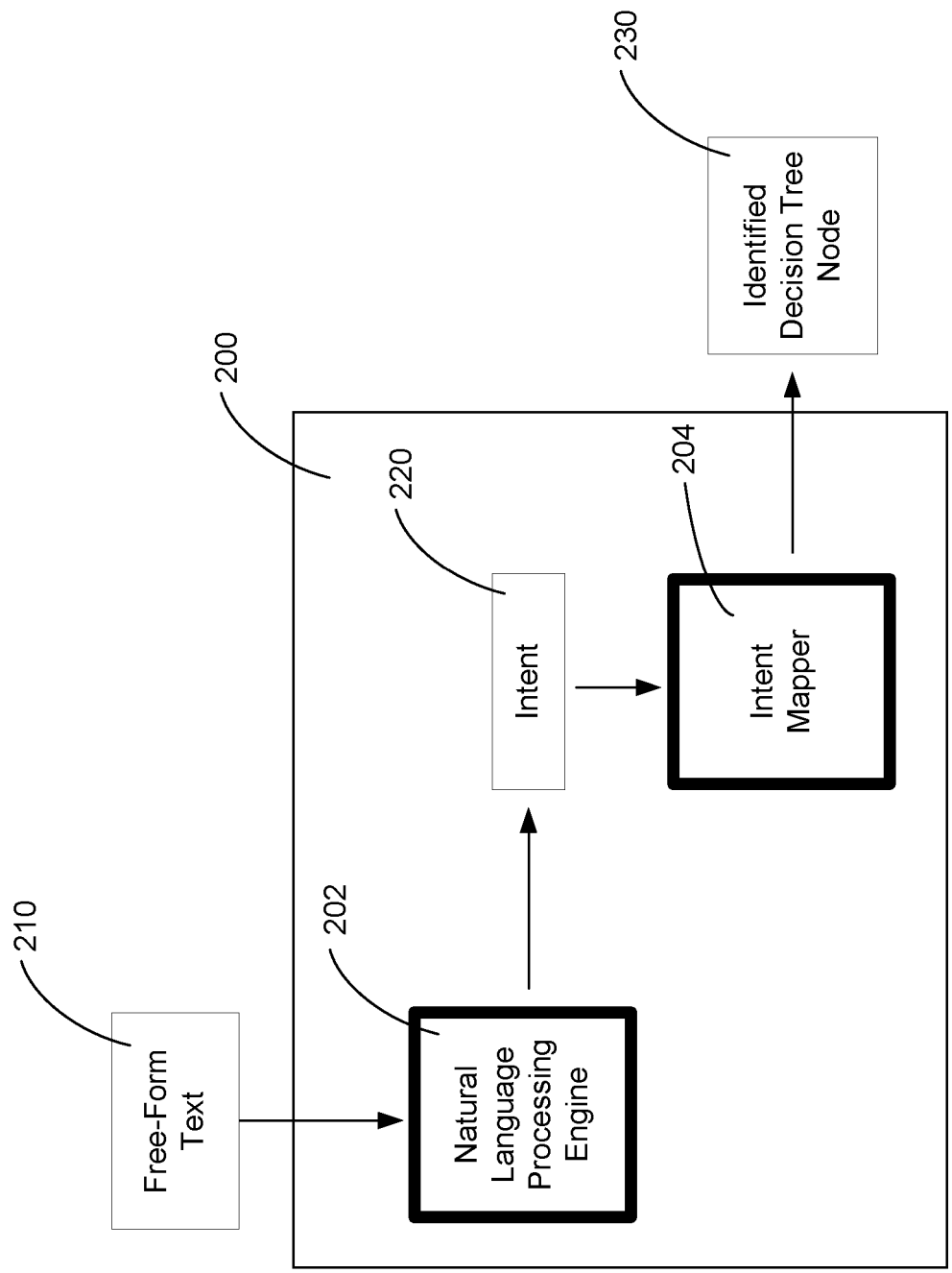
FIG. 2 is a block diagram showing a system that employs natural language processing to identify a decision tree node based on a natural language description of the circumstances of a motor vehicle collision.

A block-diagram of such a system in accordance with the subject matter of the present application is depicted in FIG. 2. As illustrated, a system 200 receives free-form text 210 representing the circumstances of a motor vehicle collision and then, based on that text, provides an identification 230 of a corresponding node of a fault-assessment rule decision tree such as, for example, a node of the example decision tree 100.

As further described below, the system 200 may correspond to a stored-program computer that has been configured with software to adapt it to act as the system 200.

The system 200 is comprised of several components. For example, as illustrated, the system 200 includes a natural language processing engine 202 and an intent mapper 204.

The natural language processing engine 202 is adapted to receive the free-form text 210. The natural language processing engine then identifies an intent 220 based on the free-form text 210. The intent 220 may be considered the result of applying a mapping between unstructured text describing the circumstances of a motor vehicle collisions and a set of possible classifications (intents) to the free-form text 210.

The natural language processing engine 202 may operate in a variety of manners and may, in some embodiments, employ known natural language processing techniques. For example, support vector machines (SVMs) and/or convolutional neural networks (CNNs) may be employed by the natural language processing engine 202. In some implementations, the natural language processing engine 202 may correspond to and/or may employ one or more commercially-available software packages and/or services for natural language classification. For example, one or more of the IBM Watson Natural Language Classifier available from International Business Machines Corp (IBM) of Armonk, N.Y., USA; the Microsoft Language Understanding Intelligence Services (LUIS) available from Microsoft Corporation of Redmond, Wash., USA; and/or Apache OpenNLP available from the Apache Software Foundation of Forest Hill, Md., USA, may be employed in a given implementation of the natural language processing engine 202. In a particular example, the natural language processing engine 202 may employ one or more natural-language processing neural networks. Such neural networks and, more broadly, the natural language processing engine 202 may, in some embodiments, be trained, at least initially using a training set (a data set for training) including unstructured texts describing the circumstances of motor vehicle collisions and corresponding intents and/or fault determinations. Some or all of those free form texts may be correspond to the circumstances of hypothetical and/or historical motor vehicle accidents. The corresponding intents and/or determinations of fault may be determined in a variety of manners including, for example, by trained experts reviewing those free form texts and/or the circumstances of the corresponding hypothetical and/or historical motor vehicle accidents and applying the fault-determination rules.

Notably, a skilled person will recognize that employing natural language processing techniques to provide an implementation of the natural language processing engine 202 consistent with the description of the system 200 and, more broadly, consistent with the present application necessarily requires the use of an electronic computer. This need for a computer is particularly clear when one considers the performance requirements necessary to realize the benefits of the subject matter of the present application including the desire to allow persons such as, for example, the aforementioned direct insurance representatives, to make a fault determination using a system consistent with the subject matter of the present application in a reasonable time such as to allow a quick fault determination to be provided to a customer (e.g., during or shortly after a telephone call).

The intent mapper 204 takes the intent 220 provided by the natural language processing engine 202 and maps it to provide the identification 230 of a corresponding node of a fault-assessment rule decision tree. In some implementations, the intent mapper 204 may correspond to a look-up table mapping possible values of the intent 220 to various nodes of a fault-determination decision tree. For example, such a look-up table may map intents to nodes of the example decision tree 100. In other implementations, the intent mapper 204 may operate in some other manner than using a look-up table. In yet other implementations, the intent mapper 204 may be omitted such as, for example, if the various possible values of the intent 220 correspond directly to the nodes of a given fault-determination decision tree. Put another way, it is possible that, in some implementations, the natural language processing engine 202 serves to classify the free-form text 210 into a set of classifications corresponding to nodes of a fault-determination decision tree.

By employing the system 200, it is possible to avoid and/or reduce the burden of using a fault-determination decision tree to assess fault. For example, in some cases the system 200 may map a given free-form text 210 to a leaf node of fault-determination decision tree thereby providing a fault determination without requiring any further processing. In another example, the system 200 may serve to "short circuit" the required analysis and may greatly reduce the number of edges of a fault-determination decision tree that need to be traversed in order to arrive at a leaf node and a fault determination.

Figure 3:
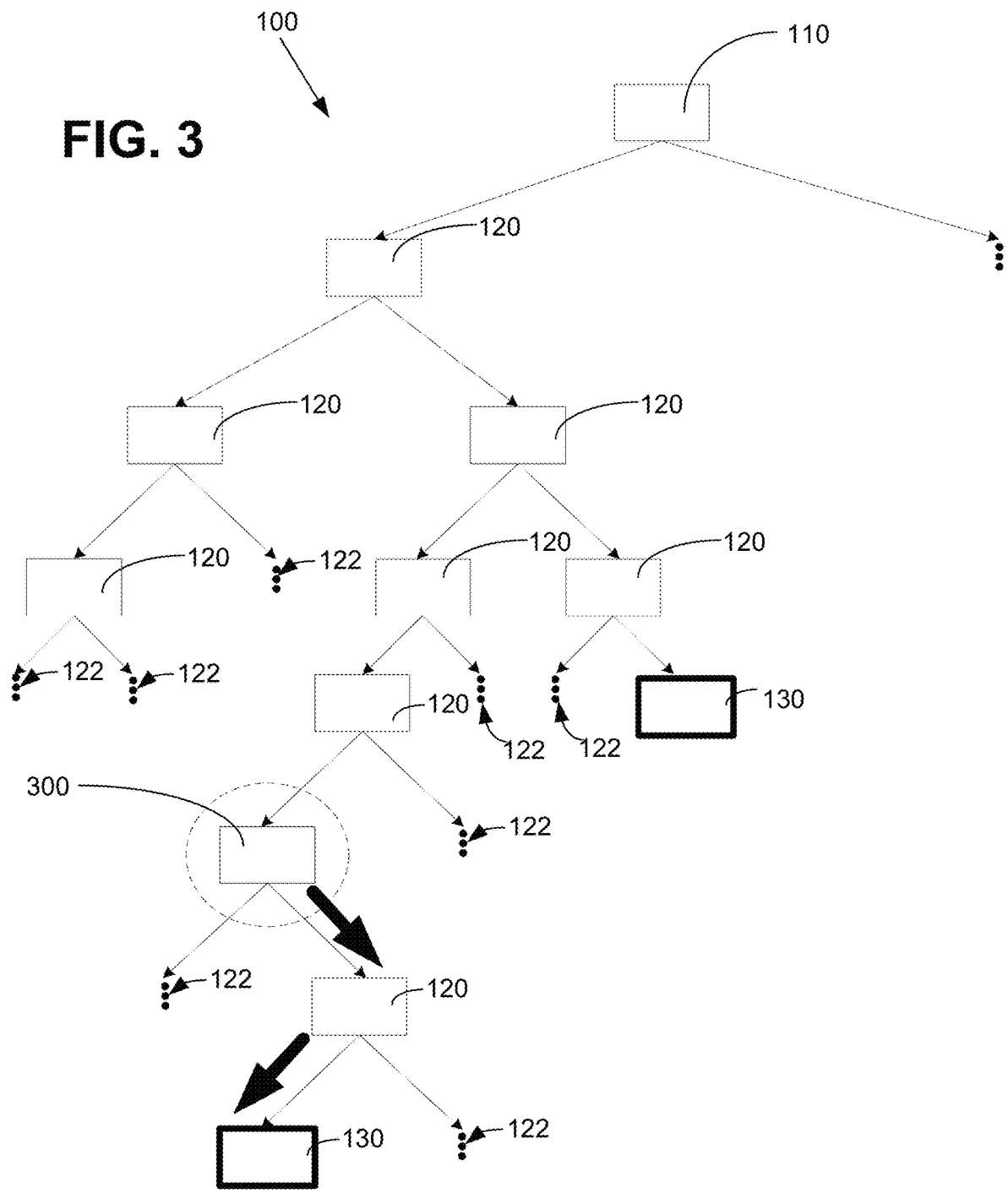
FIG. 3 shows how an internal node of the decision tree of FIG. 1 may be identified using the system of FIG. 2.

An example of how the system 200 may simplify assessment of fault using the example decision tree 100 is shown in FIG. 3.

In FIG. 3, the system 200 has been employed in order to identify, based on some free-form text 210 (not shown in FIG. 3), a corresponding node 300 of the example decision tree 100. In the illustrated case, the corresponding node 300 is one of the internal nodes 120 of the example decision tree 100. Notably, assessment of fault using the example decision tree 100 is greatly simplified in this case as compared to in FIG. 1 as only the questions corresponding to various of the child nodes of the corresponding node 300 need to be considered in order to arrive at one of the leaf nodes 130 and a fault determination. Put another way, the analysis is "short-circuited" and the nodes and the questions associated with nodes starting from the root node 110 and continuing down through the internal nodes 120 to reach the corresponding node 300 are skipped and need not be considered/answered. Instead, starting from the corresponding node 300, the aforementioned electronic computer may successively prompt based on questions associated with internal nodes starting from the corresponding node 300 and may then receive input allowing a path through the example decision tree 100 to be identified starting from the corresponding node 300 and ending at one of the leaf nodes 130, with that leaf node corresponding to a fault determination governing the circumstances of the collision in question. A comparison of FIG. 3 and FIG. 1 will reveal the path navigated through the example decision tree 100 in FIG. 3 is significantly shorter than that through the example decision tree 100 in FIG. 1 (in each case the path is depicted using bold arrows). Furthermore, the reader will appreciate that, since the example decision tree 100 is greatly simplified as noted above, the benefits of employing the system 200 and the reduction in the number of questions/internal nodes that need to be considered to assess fault in relation to a given collision may be greater in the case where it is employed in relation to a real-world fault-determination decision tree having for example, greater height and more internal nodes than are depicted in the example decision tree 100.

An example system and method such as may employ the subject matter of the present application in providing recommendations as to fault determination for motor vehicle collisions will now be discussed with reference to FIGS. 4-7.

Figure 4:
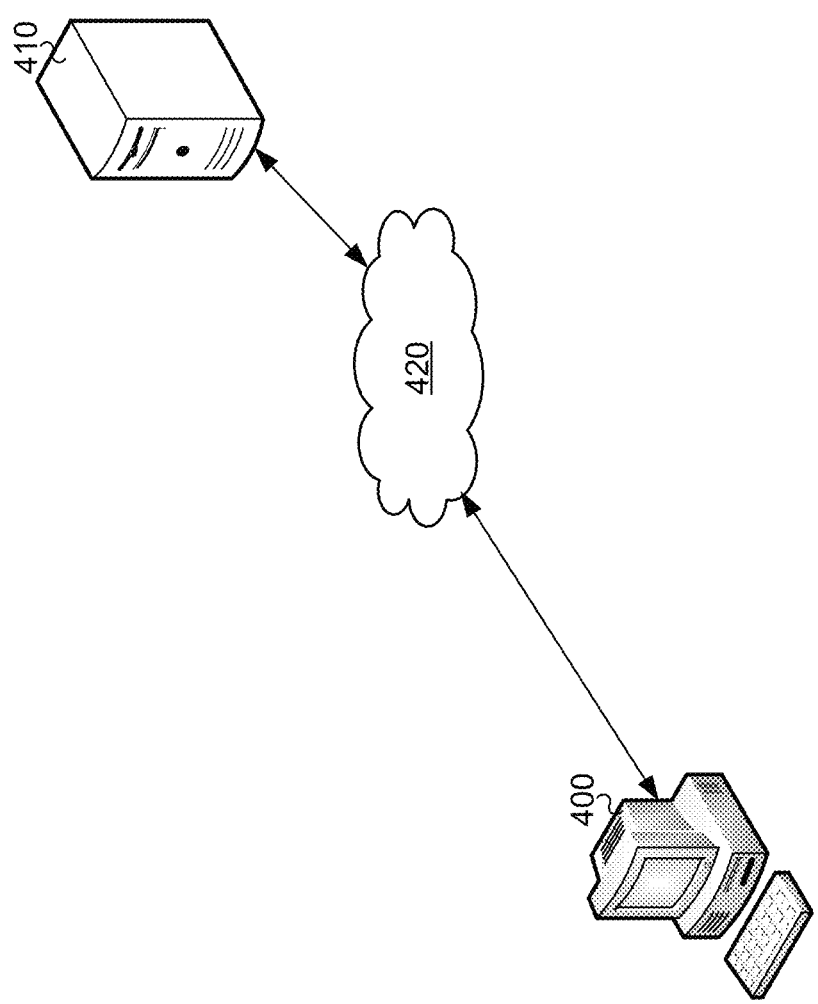
FIG. 4 is a schematic operation diagram illustrating an operating environment of an example embodiment.
Figure 5:
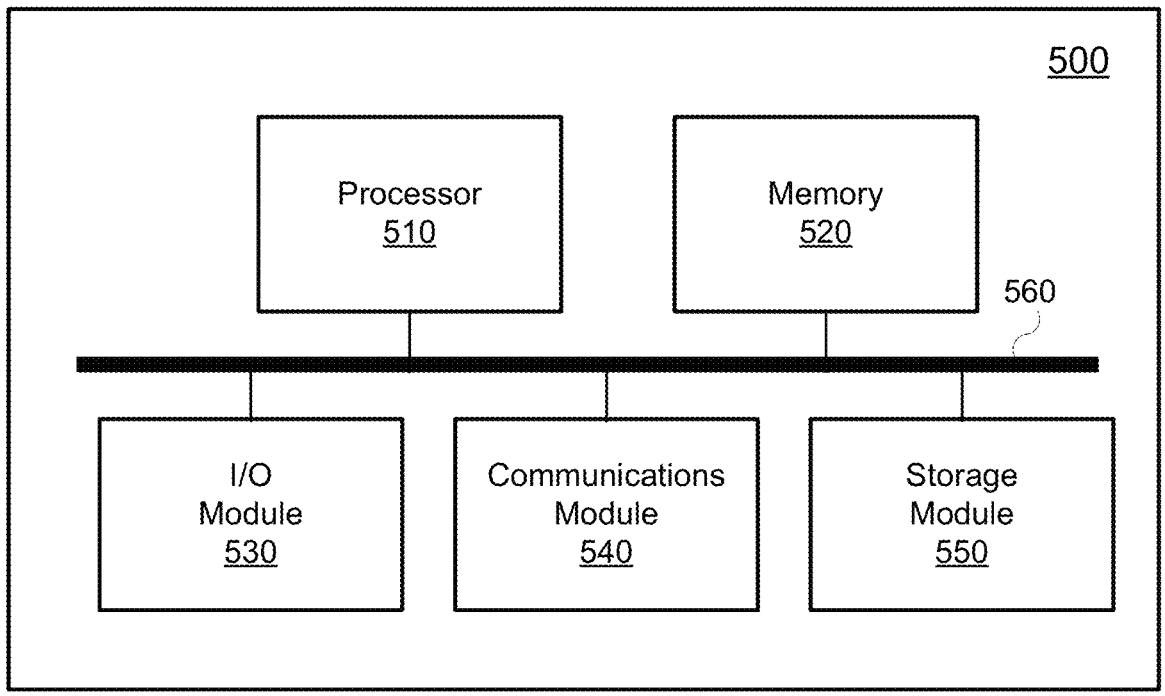
FIG. 5 depicts a high-level operation diagram of an example computing device.

FIG. 4 is a schematic operation diagram illustrating an operating environment of an example embodiment of the aforementioned example system.

As illustrated, a client computing device 400 is in communication with a server computing device 410 via a network 420.

The client computing device 400 is depicted as being a personal computer such as may, for example, be utilized by a direct insurance representative working in a call center. However, this is by way of example. In some implementations, the client computing device 400 may be a computing device of another type such as, for example, a smart phone, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), or any other type of computing device that may be configured to store data and software instructions, and execute software instructions to perform operations consistent with disclosed embodiments.

The server computing device 410 is depicted as being a server. In some implementations, the server computing device 410 may, for example, be a mainframe computer, a minicomputer, or the like. In some implementations, the server computing device 410 may be formed of or may include one or more computing devices. The server computing device 410 may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some implementations, the server computing device 410 may include multiple computing devices organized in a tiered arrangement. For example, the server computing device 410 may include middle-tier and back-end computing devices. In some implementations, the server computing device 410 may be a cluster formed of a plurality of interoperating computing devices.

The network 420 is a computer network. In some implementations, the network 420 may be an internetwork such as may be formed of one or more interconnected computer networks. The network 420 may be or may include an Ethernet network, an asynchronous transfer mode (ATM) network, a wireless network, the like, and/or more than one of any or all of the foregoing. The network 420 may employ one or more networking protocols. For example, the network 420 may be a TCP/IP network. In a particular example, the network 420 may be the Internet.

As further described below, the server computing device 410 may employ natural language processing together with a decision tree corresponding to a set of fault-determination rules in order to provide a recommendation as to fault based, at least in part, on natural language input (unstructured text) describing the circumstances of a motor vehicle collision. Notably, the server computing device 410 may be programmed with software allowing it to provide functionality consistent with the description of the system 200 above.

Each of the client computing device 400 and the server computing device 410 is a stored-programmed electronic computer. An example computing device 500, instances of which may serve as one or both the client computing device 400 and the server computing device 410 will now be described with regard to FIG. 5.

The example computing device 500 includes a variety of modules. For example, as illustrated, the example computing device 500 may include a processor 510, a memory 520, an I/O module 530, a communications module 540, and/or a storage module 550. As illustrated, the foregoing example modules of the example computing device 500 are in communication over a bus 560.

The processor 510 is a hardware processor. The processor 510 may, for example, be one or more ARM, Intel x86, PowerPC processors or the like.

The memory 520 allows data to be stored and retrieved. The memory 520 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 500.

The I/O module 530 is an input module and an output module. As an input module, the I/O module 530 allows the example computing device 500 to receive input from components of the example computing device 500. In some embodiments such as, for example, potentially where the example computing device 500 corresponds to the client computing device 400, the I/O module 530 may allow the example computing device 500 to provide output (e.g., via a screen) and/or to receive input from one or more input devices such as, for example, from a keyboard and/or a pointing device (e.g., a mouse, trackball, trackpad, or the like).

The communications module 540 allows the example computing device 500 to communicate with other computing devices and/or various communications networks, such as, for example, the network 420. The communications module 540 may allow the example computing device 500 to send or receive communications signals. Communications signals may be sent or received according to one or more protocols or according to one or more standards. For example, the communications module 540 may allow the example computing device 500 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 540 may allow the example computing device 500 to communicate via Wi-Fi™, using Bluetooth™ or via some combination of one or more networks or protocols. In some implementations, all or a portion of the communications module 540 may be integrated into a component of the example computing device 500. For example, the communications module 540 may be integrated into a communications chipset.

The storage module 550 allows data to be stored and retrieved. In some embodiments, the storage module 550 may be formed as a part of the memory 520 and/or may be used to access all or a portion of the memory 520. Additionally or alternatively, the storage module 550 may be used to store and retrieve data from persisted storage other than the persisted storage (if any) accessible via the memory 520. In some embodiments, the storage module 550 may be used to store and retrieve data in/from a database. A database may be stored in persisted storage. Additionally or alternatively, the storage module 550 may access data stored remotely such as, for example, as may be accessed using a local area network (LAN), wide area network (WAN), personal area network (PAN), and/or a storage area network (SAN). In some embodiments, the storage module 550 may access data stored remotely using the communications module 540. In some embodiments, the storage module 550 may be omitted and its function may be performed by the memory 520 and/or by the processor 510 in concert with the communications module 540 such as, for example, if data is stored remotely.

Software comprising instructions is executed by the processor 510 from a computer-readable medium. For example, software may be loaded into random-access memory from persistent storage of the memory 520. Additionally or alternatively, instructions may be executed by the processor 510 directly from read-only memory of the memory 520.

Figure 6:
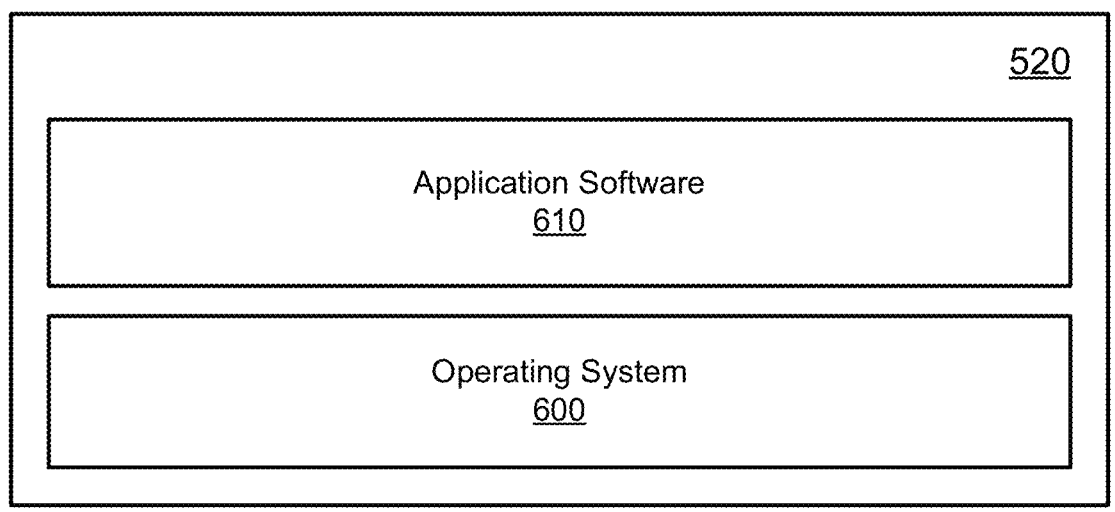
FIG. 6 depicts a simplified software organization exemplary of the example computing device of FIG. 5.

FIG. 6 depicts a simplified organization of software components stored in the memory 520 of the example computing device 500. As illustrated, these software components include an operating system 600 and an application software 610.

The operating system 600 is software. The operating system 600 allows the application software 610 to access the processor 510, the memory 520, the I/O module 530, the communications module 540, and the storage module 550 of the example computing device 500. The operating system 600 may be, for example, Google™ Android™, Apple™ iOS™, UNIX™, Linux™, Microsoft™ Windows™, Apple OSX™ or the like.

Where one or both of the client computing device 400 and the server computing device 410 correspond to respective instances of the example computing device 500, the application software 610 may adapt the example computing device 500 to perform one or more associated functions. For example, the application software 610 may adapt an instance of the example computing device 500 to serve as the server computing device 410 and to provide functionality consistent with the description of the system 200 above. Additionally or alternatively, the application software 610 may adapt an instance of the example computing device 500 to serve as the client computing device 400 providing a user thereof with access to the functionality provided by the server computing device 410.

Figure 7:
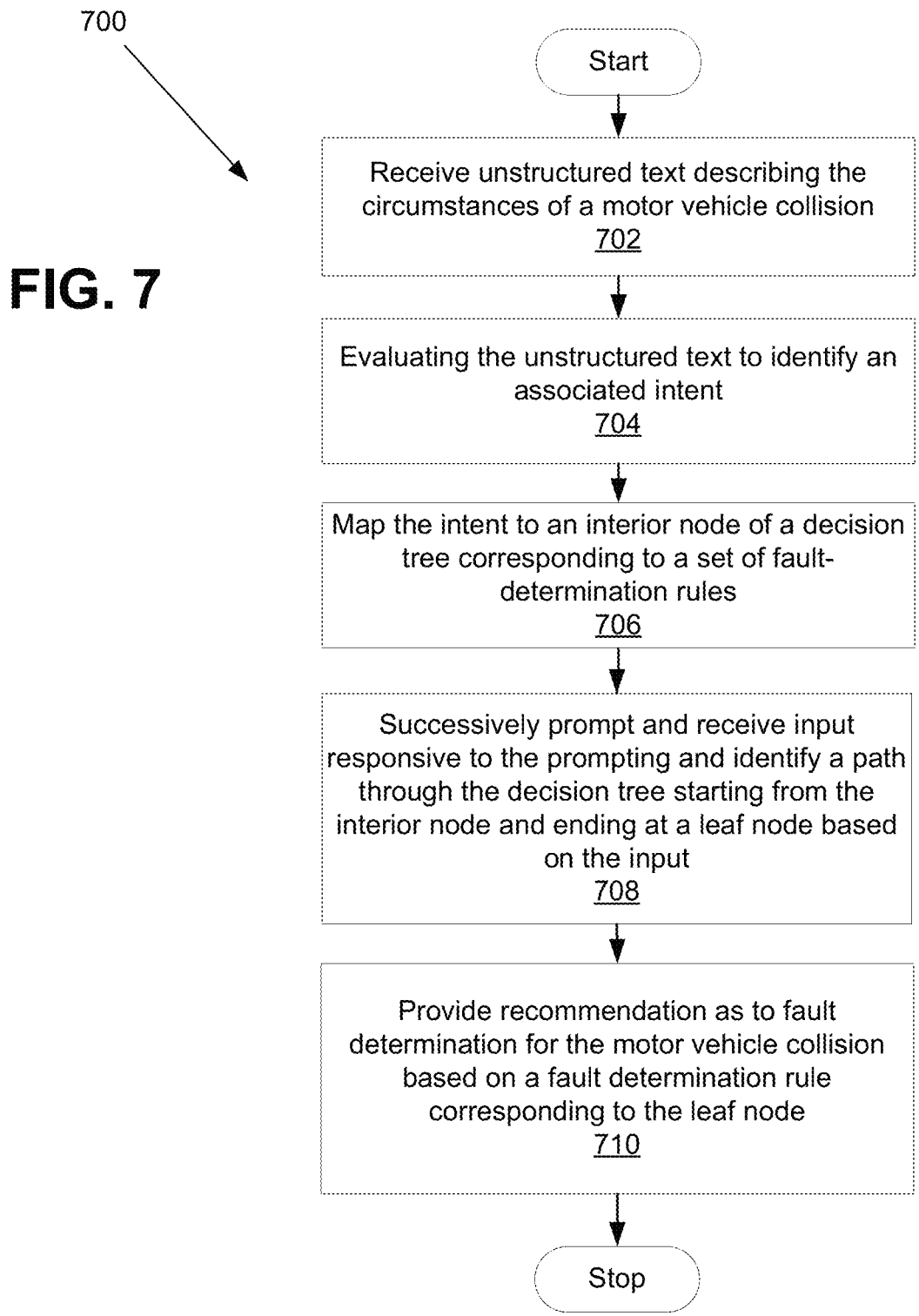
FIG. 7 is a flowchart depicting example operations performed by a computer server system in assessing fault for a motor vehicle collision based on a decision tree using the system of FIG. 2.

An example method 700 for providing a recommendation as to a fault determination for a motor vehicle collision will now be described with reference to the flowchart of FIG. 7. In particular, operations performed by the server computing device 410 in providing such a recommendation are summarized in the flowchart of FIG. 7. In performing the example method 700 depicted in the flowchart, operations starting from an operation 710 and continuing onward are performed by a processor of the server computing device 410 executing software. For example, where the server computing device 410 is or includes at least one instance of the example computing device 500, the operations may be performed by the processor 510 executing instructions of a suitable instance of the application software 610.

At the operation 702, unstructured text describing the circumstances of a motor vehicle collision is received. The unstructured text may correspond to the free-form text 210 (FIG. 2) discussed above in relation to the system 200. The unstructured text may be received for processing by a processor of the server computing device 410. The unstructured text may be received from the client computing device 400 via the network 420 such as, for example, using the communications module 540 where the server computing device 410 is or includes at least one instance of the example computing device 500.

Following the operation 702, an operation 704 is next.

At the operation 704, the unstructured text received at the operation 702 is evaluated by the processor of the server computing device 410. Based on that evaluation, an associated intent related to the circumstances of the motor vehicle collision described in the unstructured text is identified. Notably, the identification of the associated intent may be performed in a manner consistent with the description of the operation of the natural language processing engine 202 above and techniques may be employed in processing at the operation 704 consistent with that description.

Following the operation 704, an operation 706 is next.

At the operation 706, the intent identified at the operation 704 is mapped to a node of a decision tree corresponding to a set of fault-determination rules. The set of fault-determination rules to which the tree corresponds may, for example, be a set of prescribed rules such as may be set out in legislation of a corresponding jurisdiction. For example, the prescribed rules may be the Ontario fault-determination rules discussed above. The mapping performed at the operation 706 may be performed in manners consistent with the description of the operation of the intent mapper 204 above and techniques may be employed in processing at the operation 706 consistent with that description.

Notably, if the node of the decision tree to which the intent maps is a leaf node, the leaf node will correspond to a fault-determination rule and so a recommendation as to fault determination may be provided based on that corresponding fault-determination rule. However, if the node of the decision tree to which the intent maps is an internal node, further processing is required. It is this second case that is illustrated in FIG. 7. Put another way, FIG. 7 illustrates the case where the intent maps to an interior node of a decision tree corresponding to a set of a fault-determination rules.

Following the operation 706, an operation 708 is next.

At the operation 708, the processor successively prompts and receives input responsive to that prompting. The prompts may be generated by a processor of the server computing device 410 and may then be conveyed to the client computing device 400 by way of the network 420. The prompt may then be presented using an output device of the client computing device 400 (e.g., a display) and then the input responsive to the prompting may be received by the client computing device 400 and then sent to the server computing device 410 via the network 420.

The input received by the processor of the server computing device 410 corresponds to details of circumstances of the motor vehicle. More particularly, the received input may be answers to questions corresponding to internal nodes of the decision along a path starting from the internal node identified at the operation 706. That path will end at a leaf node of that decision tree. As discussed above, a leaf node of a decision tree corresponding to a set of fault-determination rules will correspond to a fault-determination rule and should match the circumstances of the motor vehicle collision to which the unstructured text received at the operation 702 and the input received at the operation 708 relate. In summary, the processor may generate prompts and receive input so as to allow the decision tree to be navigated from the identified internal node through to a leaf node in manners consistent with the discussion above of both the system 200 and its use, with those prompts being based on the various intermediate nodes along the path between the internal node identified at the operation 706 and the leaf node.

Following the operation 708, an operation 710 is next.

At the operation 710, a recommendation as to a fault determination for the motor vehicle collision is provided by a processor of the server computing device 410 based on the fault-determination rule corresponding to the leaf node terminating the path that was navigated through at the operation 708. In some implementations, the recommendation may be conveyed by the server computing device 410 to the client computing device 400 such as, for example, to allow it to be presented to a user using some output device of the client computing device 400 (e.g., a display).

The above-description is by way of example and is capable of variation without deviating from the subject matter of the present application.

As a first example of a possible variation, it may be that an action in addition to or other than presenting the recommendation as to determination of fault identified may be taken responsive to reaching a leaf node of the decision tree in the example method 700. For example, such an action may include, at the operation 710, initiation of the processing of an insurance claim related to the motor vehicle accident. In and/or responsive to such processing, responsibility for the motor vehicle collision may, for example, be apportioned between one or more insurers (e.g., insurers of the vehicles/persons involved in the collision) based on the recommendation as to the determination of fault in addition to or as an alternative to providing the recommendation such as, for example, for presentation to user. In a particular example, the server computing device 410 may communicate (e.g., via the network 420) with one or more other server computing devices so as to initiate processing of such a claim.

In another example of a possible variation, a confidence value may be provided in association with a recommendation. Such a confidence value may, for example, be computed based on confidence associated with the identification of the internal node. In a particular example, the confidence may relate to a confidence associated with intent identification for a given free form, unstructured text (e.g., for an intent identified at the operation 704 based on unstructured text received at the operation 702).

In another example of a possible variation, free-form texts and corresponding recommendations as to determination of fault obtained across successive performing of the example method 700 may be collected for use in training a natural-language processing neural network such as was discussed above in relation to the natural language processing engine 202 (i.e., one or more natural-language processing neural networks for use in evaluating unstructured text describing the circumstances of motor vehicle collisions to identify intents related to the circumstances of the motor vehicle collisions). For example, unstructured text and corresponding recommendations/determinations of fault may be added to and/or used to generated a new training set for training such natural-language processing neural networks. Additionally, where a confidence level is calculated for the recommendation as discussed above, it may also be added to the data set for training the natural-language processing neural network. For example, a recommendation as to the determination of fault may be added to the data set together with associated confidence levels and/or unstructured text. Notably, where such data (including or not including an associated confidence level) is added to an existing training set, it may be that the evaluation of unstructured text and the identification of associated intent related to the circumstances of a motor vehicle described therein that resulted in that added data were performed based on a natural-language processing network trained using an earlier version of the data set.

In another example of a possible variation, it is noted that composing a decision tree from fault-determination rules may be a labor-intensive task. Additionally or alternatively, it may be that the fault-determination rules of some jurisdictions are incomplete. The inventors have recognized that the fault-determination rules of some jurisdictions are, however, a subset of and/or less complicated than those of other jurisdictions. For example, in Canada, the Ontario fault-determination rules discussed above may be considered both more comprehensive and more complex than those of some other Canadian provinces such as, for example, Prince Edward Island (PEI). Furthermore, some of those other Canadian provinces (again, e.g., PEI) may be too small for the work to build out a decision tree based on the relevant provincial fault-determination rules to be justifiable/economic. Additionally or alternatively, such a small market may not allow for collection of a suitable training set organically as discussed above and/or it may not be cost-effective to generate one manually using experts and hypothetical and/or historical collisions as discussed above.

As mentioned, the Ontario fault-determination rules are relatively comprehensive. Indeed, the Ontario fault-determination rules apre at least as specific as those of all of the other Canadian provinces that have fault-determination rules. For example, in Ontario specific rules are provided for situations that require fall back to a more generic "catch all" rule under the fault-determination rules of other provinces.

A decision tree and intent classifier developed for a "comprehensive" fault-determination jurisdiction such as Ontario may be employed for other provinces as follows. A legislative concordance can be developed mapping from fault as determined under the more comprehensive fault-determination rules of one jurisdiction (e.g., from the Ontario regulations) to the regulations of one or more second jurisdictions. Such a legislative concordance is, in effect, a look-up table mapping between the fault-determination rules of different sets of fault-determination rules. To assess fault for a second regulatory jurisdiction (i.e., under its rules), the decision tree and intent classifier associated with a first regulatory jurisdiction (i.e., the more comprehensive jurisdiction) may be employed to arrive at a recommendation as to fault determination in manners discussed above. Then, once fault has been determined under those more comprehensive rules, the result can be mapped using the relevant concordance to arrive at corresponding fault-determination rule of the second regulatory jurisdiction. A recommendation as to the determination of fault can then be provided based on that rule (the rule of the second regulatory jurisdiction).

In some cases, the second regulatory jurisdiction may be identified from amongst a set of available secondary regulatory jurisdictions, some or all of which have associated fault-determination rules less specific than those of the first regulatory jurisdiction. In some implementations, the second regulatory jurisdiction may be automatically identified based on a current location of an input device used to provide the unstructured text describing the circumstances of a motor vehicle collision under consideration and/or to provide input received to navigate a decision tree. In a particular example, where the input device used to provide such input corresponds to the client computing device 400, the client computing device 400 may provide its location for use in making such a selection. The client computing device 400 may determine its location in a variety of manners. For example, the client computing device 400 may include or may interact with a receiver for one or more of satellite-based location systems, such as, for example, global positioning satellite (GPS), GLONASS, BeiDou Navigation Satellite System (BDS), and/or Galileo in order to locate the client computing device 400. Additionally or alternatively, the client computing device 400 may employ other techniques/technologies for geographic location determination such as, for example, cell-tower triangulation and/or the use of wireless (e.g., Wi-Fi) hotspot location data. In another example, a geographic location may be determined using cell-tower triangulation.

In another example of a possible variation, more than one decision tree may be provided for different jurisdictions such as, for example, covering jurisdictions having fault-determination rules that cannot be properly mapped to from those of another jurisdiction using a concordance as discussed above. In some implementations, the server computing device 410 may identify the relevant decision tree from amongst a set of decision trees corresponding to sets of prescribed fault-determination rules of different jurisdictions. For example, a relevant jurisdiction may be identified based on location in manners similar to as was discussed above in relation to the identification of second regulatory jurisdictions above.

In another example of a possible variation, the interface for a system in accordance with the subject matter of the present application may correspond to a chat bot. For example, such a chat bot may provide a conversational interface prompting a user to first describe the circumstances of a motor vehicle collision (thereby providing the unstructured text describing the circumstances) and/or may, responsive to receiving such unstructured text, engage the user in a conversation corresponding to prompts (questions/output from the bot) and responses (answers/input to the bot by a user) consistent with prompts and responses required for navigation of a decision tree starting from an interior node identified based on unstructured text in manners discussed above (e.g., in relation to the operation 708).

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:
1. A computer system comprising:
a processor;
a memory storing instructions that, when executed by the computer system, cause the computer system to:

receive, by the processor and from a computing device, unstructured text describing circumstances of a motor vehicle collision;

identify, by a natural language processing engine of the computer system and based on the unstructured text, an associated intent related to the circumstances of the motor vehicle collision to be mapped via an intent mapper of the computer system;

map, via the intent mapper of the computer system, the intent identified by the natural language processing engine to an internal node of a decision tree corresponding to a set of prescribed fault-determination rules;

successively prompt, via the computing device, and receive, by the processor and from the computing device, input responsive to the prompting and corresponding to details of the circumstances of the motor vehicle collision and identify, based on the input received from the computing device responsive to the prompting, a path through the decision tree starting from the internal node and ending at a leaf node of the decision tree, the leaf node corresponding to a fault-determination rule governing motor vehicle collisions and matching the circumstances of the motor vehicle collision; and provide, by the processor, a recommendation as to a fault determination for the motor vehicle collision based on the fault-determination rule.

2. The computer system of claim 1, wherein the instructions, when executed by the computer system, further cause the computer system to:

initiate processing of an insurance claim related to the motor vehicle collision wherein responsibility for the motor vehicle collision is to be apportioned between one or more insurers based on the recommendation as to the determination of fault.

3. The computer system of claim 1, wherein the prompting includes presenting prompts based on intermediate nodes along the path between the internal node and the leaf node of the decision tree.

4. The computer system of claim 1, wherein the prescribed fault-determination rules correspond to a first regulatory jurisdiction and wherein providing the recommendation as to the determination of fault for the motor vehicle collision based on the fault-determination rule includes mapping the fault-determination rule to a corresponding fault-determination rule of a second regulatory jurisdiction and providing the recommendation as to the determination of fault based on the corresponding fault-determination rule.

5. The computer system of claim 4, wherein the instructions, when executed by the computer system, further cause the computer system to:

identify the second regulatory jurisdiction from amongst a plurality of secondary regulatory jurisdictions.

6. The computer system of claim 5, wherein the second regulatory jurisdiction is identified based on a current location of an input device used to provide at least one of the unstructured text describing the circumstances of the motor vehicle collision and the input received responsive to the prompting.

7. The computer system of claim 5, wherein at least one of the plurality of secondary regulatory jurisdictions has an associated set of fault-determination rules that is less comprehensive than the prescribed fault-determination rules of the first regulatory jurisdiction.

8. The computer system of claim 1, wherein the instructions, when executed by the computer system, further cause the computer system to:

calculate a confidence level in association with the recommendation.

9. The computer system of claim 8, wherein the instructions, when executed by the computer system, further cause the computer system to:

add the recommendation as to the determination of fault and the associated confidence level to a data set for training a natural-language processing neural network for use in evaluating unstructured text.

10. The computer system of claim 1, wherein at least one of the unstructured text describing the circumstances of the motor vehicle collision and the input received responsive to the prompting is received via a chat bot.

11. The computer system of claim 1, wherein the instructions, when executed by the computer system, further cause the computer system to:

identify the decision tree from amongst a plurality of decision trees corresponding to sets of prescribed fault-determination rules of different jurisdictions.

12. A computer-implemented method comprising:

receiving, from a computing device, unstructured text describing circumstances of a motor vehicle collision;

identifying, by a natural language processing engine of a computer system and based on the unstructured text, an associated intent related to the circumstances of the motor vehicle collision to be mapped via an intent mapper of the computer system;

mapping, via the intent mapper of the computer system, the intent identified by the natural language processing engine to an internal node of a decision tree corresponding to a set of prescribed fault-determination rules;

successively prompting, via the computing device, and receiving from the computing device input responsive to the prompting and corresponding to details of the circumstances of the motor vehicle collision and identifying, based on the input received from the computing device responsive to the prompting, a path through the decision tree starting from the internal node and ending at a leaf node of the decision tree, the leaf node corresponding to a fault-determination rule governing motor vehicle collisions and matching the circumstances of the motor vehicle collision; and providing a recommendation as to a fault determination for the motor vehicle collision based on the fault-determination rule.

13. The method of claim 12, further comprising:

initiating processing of an insurance claim related to the motor vehicle collision wherein responsibility for the motor vehicle collision is to be apportioned between one or more insurers based on the recommendation as to the determination of fault.

14. The method of claim 12, wherein the prompting includes presenting prompts based on intermediate nodes along the path between the internal node and the leaf node of the decision tree.

15. The method of claim 12, wherein the prescribed fault-determination rules correspond to a first regulatory jurisdiction and wherein providing the recommendation as to the determination of fault for the motor vehicle collision based on the fault-determination rule includes mapping the fault-determination rule to a corresponding fault-determination rule of a second regulatory jurisdiction and providing the recommendation as to the determination of fault based on the corresponding fault-determination rule.

16. The method of claim 15, further comprising:
identifying the second regulatory jurisdiction from amongst a plurality of secondary regulatory jurisdictions, wherein the second regulatory jurisdiction is identified based on a current location of an input device used to provide at least one of the unstructured text describing the circumstances of the motor vehicle collision and the input received responsive to the prompting.

17. The method of claim 16, wherein at least one of the plurality of secondary regulatory jurisdictions has an associated set of fault-determination rules that is less comprehensive than the prescribed fault-determination rules of the first regulatory jurisdiction.

18. The method of claim 12, further comprising:
calculating a confidence level in association with the recommendation as to the determination of fault; and
adding the recommendation as to the determination of fault and the associated confidence level to a data set for training a natural-language processing neural network for use in evaluating unstructured text describing the circumstances of motor vehicle collisions to identify intents related to the circumstances of the motor vehicle collisions, wherein the evaluation of the unstructured text.

19. A non-transitory computer-readable storage medium storing instructions that, when executed by a processor of computer system, cause the computer system to:

receive, from a computing device, unstructured text describing circumstances of a motor vehicle collision;

identify, by a natural language processing engine of the computer system and based on the unstructured text, an associated intent related to the circumstances of the motor vehicle collision to be mapped via an intent mapper of the computer system;

map, via the intent mapper of the computer system, the intent identified by the natural language processing engine to an internal node of a decision tree corresponding to a set of prescribed fault-determination rules;

successively prompt, via the computing device, and receive from the computing device input responsive to the prompting and corresponding to details of the circumstances of the motor vehicle collision and identify, based on the input received from the computing device responsive to the prompting, a path through the decision tree starting from the internal node and ending at a leaf node of the decision tree, the leaf node corresponding to a fault-determination rule governing motor vehicle collisions and matching the circumstances of the motor vehicle collision; and provide a recommendation as to a fault determination for the motor vehicle collision based on the fault-determination rule.

* * * * *